United States Patent
Park et al.

(10) Patent No.: US 9,346,364 B2
(45) Date of Patent: May 24, 2016

(54) METHOD FOR EMERGENCY DRIVING OF HYBRID ELECTRIC VEHICLE

(71) Applicant: Hyundai Motor Company, Seoul (KR)

(72) Inventors: Hong Geuk Park, Chungcheongnam-Do (KR); Mushin Kwak, Gyeonggi-Do (KR); Sung Kyu Kim, Gyeonggi-Do (KR); Su Hyun Bae, Daegu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,744

(22) Filed: Dec. 7, 2014

(65) Prior Publication Data

US 2015/0291040 A1    Oct. 15, 2015

(30) Foreign Application Priority Data

Apr. 14, 2014 (KR) .......................... 10-2014-0043948

(51) Int. Cl.
*B60L 3/00* (2006.01)
*B60L 11/14* (2006.01)
*B60L 11/12* (2006.01)

(52) U.S. Cl.
CPC *B60L 11/14* (2013.01); *B60L 11/12* (2013.01)

(58) Field of Classification Search
CPC ...................................................... B60L 3/00
USPC ............................................................ 701/22
See application file for complete search history.

(56) References Cited

U.S. PATENT DOCUMENTS 8,504,231 B2    8/2013   Kim

FOREIGN PATENT DOCUMENTS

| EP | 768204 | A1 | * | 4/1970 | |
|---|---|---|---|---|---|
| JP | 06080048 | A | * | 3/1994 | |
| JP | DE 19816450 | A1 | * | 6/1999 | ............... B60K 6/36 |
| JP | 2004248384 | A | * | 9/2004 | |
| KR | 10-2008-0014395 | A | | 2/2008 | |
| KR | 10-2008-0087487 | A | | 10/2008 | |
| KR | 10-0901564 | B1 | | 6/2009 | |
| KR | 10-2009-0108325 | A | | 10/2009 | |
| KR | 20090108325 | A | * | 10/2009 | |
| KR | 10-2012-0005746 | A | | 1/2012 | |
| KR | 10-2012-0064455 | A | | 6/2012 | |
| KR | 10-2014-0087581 | A | | 7/2014 | |
| KR | 20150078365 | A | * | 7/2015 | |

* cited by examiner

*Primary Examiner* — Joseph Waks
(74) *Attorney, Agent, or Firm* — Mintz Levin Cohn Ferris Glovsky and Popeo, P.C.; Peter F. Corless

(57) ABSTRACT

A method for emergency driving is carried out in a hybrid vehicle which includes an engine, a first motor connected to the engine through an engine clutch, and a second motor directly connected to the engine so that power transmission is possible, where a DC-link is charged with a counter electromotive force of the first and second motors, generated by driving energy of the vehicle or power of the engine when a main relay is off during driving of the vehicle. The DC-link of which voltage control is performed is used as a power source for the emergency driving of the vehicle. In the emergency driving of the vehicle using the DC-link as the power source, the engine clutch between the engine and the first motor is separated, and the vehicle is then driven by a driving force of the first motor.

9 Claims, 6 Drawing Sheets

METHOD FOR EMERGENCY DRIVING OF HYBRID ELECTRIC VEHICLE

CROSS-REFERENCE TO RELATED APPLICATION

This application claims under 35 U.S.C. §119(a) the benefit of Korean Patent Application No. 10-2014-0043948 filed on Apr. 14, 2014, the entire contents of which are incorporated herein by reference.

BACKGROUND (a) Technical Field

The present invention relates to a method for emergency driving of a hybrid electric vehicle. More particularly, the present invention relates to a method for emergency driving of a hybrid electric vehicle, in which the vehicle is able to perform the emergency driving when a high voltage main relay is abnormally off during driving of the vehicle.

(b) Description of the Related Art

A hybrid vehicle refers to a vehicle that can be driven by efficiently combining two or more different kinds of driving sources. In common usage, a hybrid vehicle refers to a vehicle driven by an engine obtaining torque from combustion of fuel and a motor obtaining torque from electric energy of a battery.

In the hybrid vehicle, various power transmission structures can be configured using the engine and the motor. Most hybrid vehicles employ one of parallel-type and serial-type power transmission structures.

The hybrid vehicle can obtain the optimal output torque, based on how to harmoniously operate the two driving sources, i.e., the engine and the motor while the vehicle is being driven using the engine and the motor.

The hybrid vehicle is driven in an electric vehicle (EV) mode that is a pure electric vehicle mode using only power of the motor or in a hybrid electric vehicle (HEV) mode using together power of the engine and power of the motor.

When the hybrid vehicle is braked or when the hybrid vehicle is driven by inertia, a regenerative braking (RB) mode in which braking and inertia energy are collected through power generation of the motor is performed.

A typical powertrain of the hybrid vehicle is of a type have an engine clutch between the engine and the motor, and has a structure in which the engine, the engine clutch interposed between the engine and the motor, the motor (driving motor) and a transmission are sequentially arranged. A battery is rechargeably connected to the motor through an inverter that is a power conversion device.

FIGS. 1 and 2 are diagrams illustrating main components of a hybrid vehicle having two motors (MG1 and MG2) 3 and 5. An engine clutch 2 is interposed between an engine for driving the vehicle and a first motor (MG1) 3. The engine 1 and the first motor 3 may be mechanically connected by the engine clutch 2 so that power can be transmitted therebetween. Alternatively, the engine 1 and the first motor 3 may be separated by the engine clutch 2 so that the power transmission is interrupted.

The first motor 3 is mechanically connected to a vehicle wheel 9 through a transmission 8 so that power can be transmitted. Accordingly, when the engine 1 and the first motor 3 are driven, the power can be transmitted to the wheel 9 through the transmission 8.

The hybrid vehicle further includes a second motor (MG2) 5 mechanically connected to the engine 1 through a belt or the like so that power can be transmitted, a first inverter 4 for driving the first motor 3, and a second inverter 6 for driving the second motor 5. The first and second inverters 4 and 6 are connected to a high voltage battery (main battery) 10 through a DC-link 7 having a capacitor C.

The first and second inverters 4 and 6 supply, to the high voltage battery 10, regenerative power generated by the motors 3 and 5 in regeneration of the motors through the DC-link 7, or receive power from the high voltage battery 10 through the DC-link 7 to drive the motors 3 and 5.

In addition to the first and second inverters 4 and 6, high voltage components including a low voltage DC to DC converter (LDC) 13, an air conditioner compressor (A/C), an electric oil pump (EOL) and the like, which will be described later, also receives power of a high voltage power source through the DC-link 7.

A main relay 11 for selectively supplying/interrupting the power of the high voltage battery 10 is installed in the hybrid vehicle. The main relay 11 is positioned between the high voltage battery 10 and the DC-link 7 to mechanically connect or interrupt the flow of power (to control the power between the high voltage battery 10 and the DC-link 7).

The on/off of the main relay 11 is controlled by a battery management system (BMS) 12. The high voltage battery 10 supplies power through the main relay 11 or receives power through the main relay 11 to stores the received power.

A low voltage (12V) battery (auxiliary battery) 14 and a low voltage electric field load (not shown) are connected to the DC-link 7 through the LDC 13. In addition, high voltage components including the A/C 15, the EOP 16 and the like are connected to the DC-link 7, to receive the power of the high voltage battery 10.

The LDC 13 is a device that acts as an alternator of a general gasoline vehicle in the hybrid vehicle. The LDC 13 performs power conversion between a high voltage power source and a low voltage electric field load (a low voltage battery or a low voltage electric field load in other vehicles). The LDC 13 drops a DC voltage of a high voltage power source in the vehicle, such as the high voltage battery 10, and supplies the dropped DC voltage to the low voltage battery 14 and other low voltage electric field loads.

That is, the LDC 13 converts the high voltage DC voltage supplied from the high voltage battery 10 and the high voltage DC voltage of regenerative energy generated by the motors 3 and 5 into a low voltage DC voltage, and charges the low voltage DC voltage in the low voltage battery 14 or supplies the low voltage DC voltage to the low voltage electric field load.

The LDC 13 does not receive a high voltage input and therefore does not operate. If the LDC 13 does not operate, the charging of the low voltage (12V) battery 14 is impossible, and the LDC 13 cannot perform its function of supplying power to the low voltage electric field load.

Therefore, the low voltage (12V) electric field load continuously consumes the power of the low voltage battery 14. As a result, the low voltage battery 14 is discharged, which causes inconvenience in normal driving of the vehicle. In addition, the driver's safety is threatened.

Particularly, if the low voltage battery 14 is discharged during driving of the vehicle, most controllers in the vehicle, which receive power from the low voltage battery 14, stop operating.

For example, if the low voltage battery 14 is discharged to a predetermined voltage or less, a control power source of a motor driven power steering (MDPS) device in the vehicle is most sensitively off. Accordingly, a steering wheel is locked in the discharging of the low voltage battery 14, and therefore, the driver's safety is seriously threatened.

When the high voltage main relay 11 is off, operations of other various kinds of high voltage components, e.g., the A/C 15, the EOP 16 and the like are also impossible.

Particularly, the EOP 16 is installed to supply oil pressure to the transmission 8. When the EOP 16 does not operate, the oil pressure in the transmission 8 is not formed, and hence a problem occurs in that the driving of the vehicle is impossible.

Unlike a vehicle using a mechanical oil pump and an electric oil pump, when a main relay is off due to fail of other high voltage components during driving of a vehicle having only a high voltage electric oil pump mounted therein, the electric oil pump also receives no driving power. Therefore, the oil pressure of a transmission cannot be formed, and the driving of the vehicle is impossible.

SUMMARY

The present invention provides a method for enabling a high voltage component such as a low voltage DC to DC converter (LDC) or electric oil pump (EOP) driven at a high voltage even in a situation in which a high voltage main relay of a hybrid vehicle is abnormally off, and enabling the hybrid vehicle having the high voltage component mounted therein to perform emergency driving in a limp-home mode.

In one aspect, the present invention provides a method for emergency driving of a hybrid vehicle which includes an engine, a first motor connected to the engine through an engine clutch, the first motor being connected to a vehicle wheel side so that power transmission is possible, and a second motor directly connected to the engine so that power transmission is possible, the method including: charging a DC-link with a counter electromotive force of the first and second motors, generated by driving energy of the vehicle or power of the engine when a main relay is off during driving of the vehicle; controlling the voltage of the DC-link, using a second inverter connected between the DC-link and the second motor in an engine driving state; and using the DC-link of which voltage control is performed as a power source for the emergency driving of the vehicle, wherein, in the emergency driving of the vehicle using the DC-link as the power source, the engine clutch between the engine and the first motor is separated, and the vehicle is then driven by a driving force of the first motor.

In an exemplary embodiment, the method may further include deciding whether the voltage controllable output of the second inverter satisfies a condition in which the driving of a first inverter connected between the DC-link and the first motor and the driving of a high voltage component are possible. When the condition is satisfactory, the emergency driving where the vehicle is driven by the driving force of the first motor may be performed.

In another exemplary embodiment, when the condition is not satisfactory, it may be decided whether the voltage controllable output of the second inverter satisfies a condition in which the driving of the high voltage component is possible. When the voltage controllable output of the second inverter satisfies the condition in which the driving of the high voltage component is possible, the engine clutch may be controlled in a slipping state, and simultaneously, the emergency driving where the vehicle may be driven by the driving force of the first motor using the DC-link as the power source and the power of the engine.

In still another exemplary embodiment, in the emergency driving of the vehicle using the DC-link as the power source, the high voltage component may be driven using the DC-link as the power source.

In yet another exemplary embodiment, the high voltage component may include an electric oil pump (EOP) for forming oil pressure of the engine clutch and a transmission.

In still yet another exemplary embodiment, when 'voltage controllable output $(T^*_{e2} \times \omega_{r2})$ of the second inverter>demand output $(T^*_{e1} \times \omega_{r1})$ of the first inverter+demand output of the high voltage component', it may be decided that the voltage controllable output of the second inverter satisfies the condition in which the driving of the first inverter and the driving of the high voltage component are possible. Here, $T^*_{e2}$ is a torque instruction with respect to the second inverter, $\omega_{r2}$ is a rotary angular speed of the second motor, $T^*_{e1}$ is a torque instruction with respect to the first inverter, and $\omega_{r1}$ is a rotary angular speed of the first motor.

In a further exemplary embodiment, in the controlling of the voltage of the DC-link, the second inverter may be controlled to receive a torque instruction for maintaining a constant voltage from a voltage controller and to output torque according to the torque instruction from the second motor.

In another further exemplary embodiment, in the controlling of the voltage of the DC-link, the torque instruction for controlling the second inverter may be calculated according to a voltage target value of the DC-link, a voltage detection value of the DC-link and a rotary speed of the second motor.

In still another further exemplary embodiment, in the controlling of the voltage of the DC-link, a regenerative torque instruction may be generated when the voltage detection voltage of the DC-link is smaller than the voltage target value of the DC-link, and a driving torque instruction may be generated when the voltage detection voltage of the DC-link is greater than the voltage target value of the DC-link.

Other aspects and exemplary embodiments of the invention are discussed infra.

According to the method of the present invention, the DC-link can charged with the counter electromotive force generated in the first and second motors, and the high voltage component such as the LDC, EOP or air conditioner compressor (A/C) can be driven using, as a power source, the DC-link voltage controlled through the second inverter.

Further, the emergency driving of the vehicle using the first motor as a driving source is possible using the DC-link as the power source in addition to the driving of the high voltage component.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
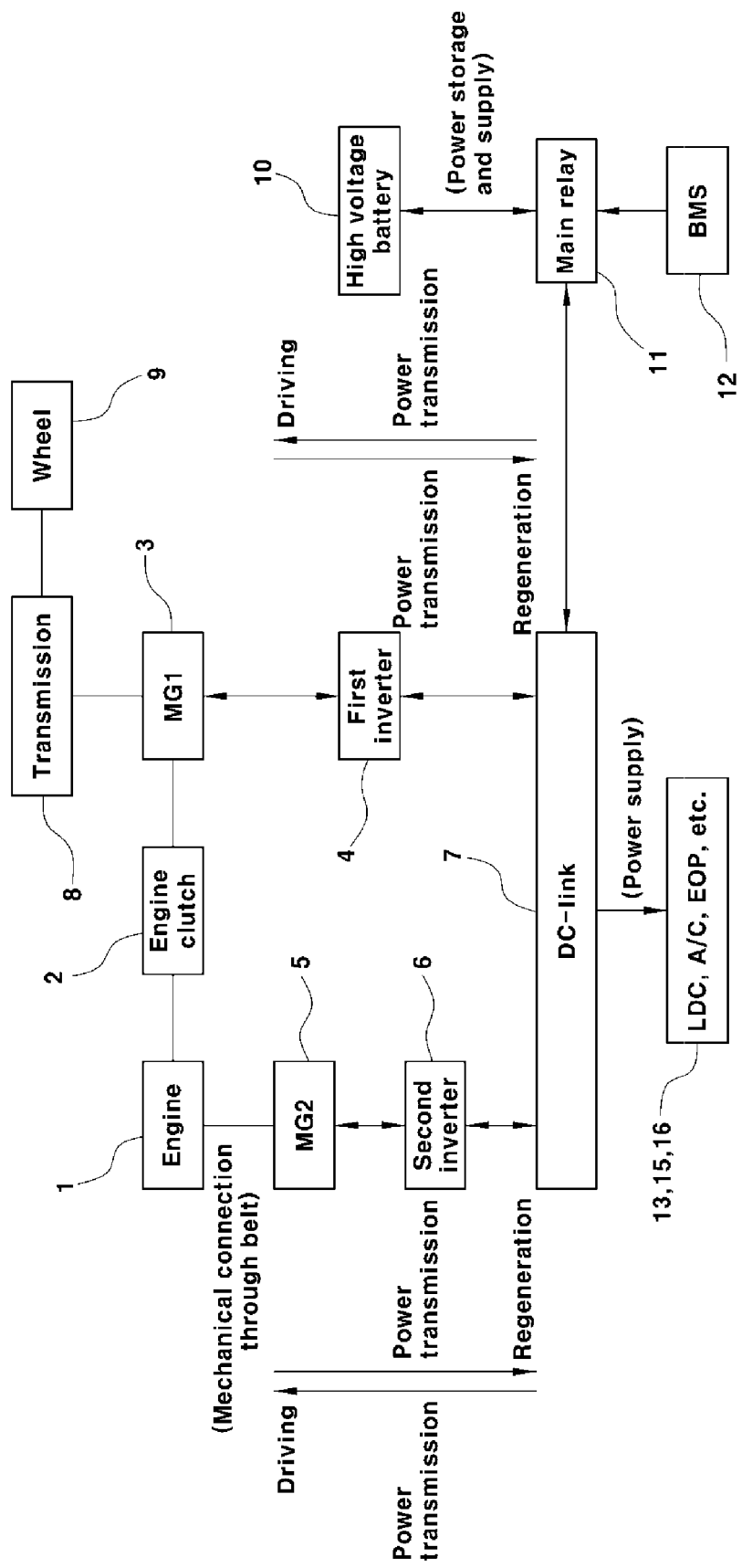
FIGS. 1 and 2 (RELATED ART) are diagrams illustrating the main components of a hybrid vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides a method for emergency driving of a hybrid electric vehicle, in which enables the vehicle to perform the emergency driving in a limp-home mode (=emergency driving mode) when a high voltage main relay is abnormally off during driving of the vehicle.

Figure 2:
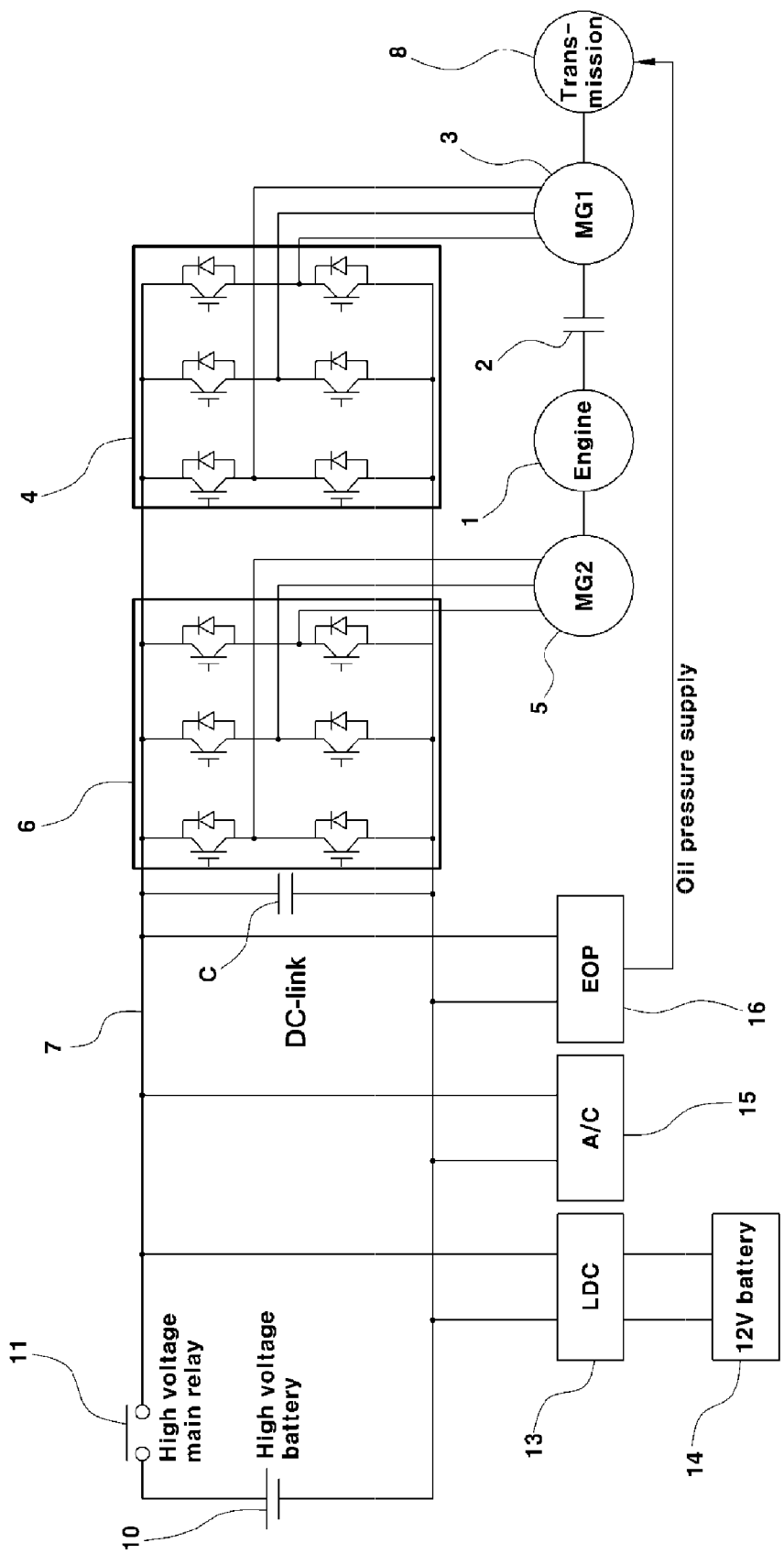

The main components of a hybrid vehicle to which the present invention is applied and the role and function of each component are not different from those described with reference to FIGS. 1 and 2, and therefore, their descriptions will be omitted to avoid redundancy.

Figure 3:
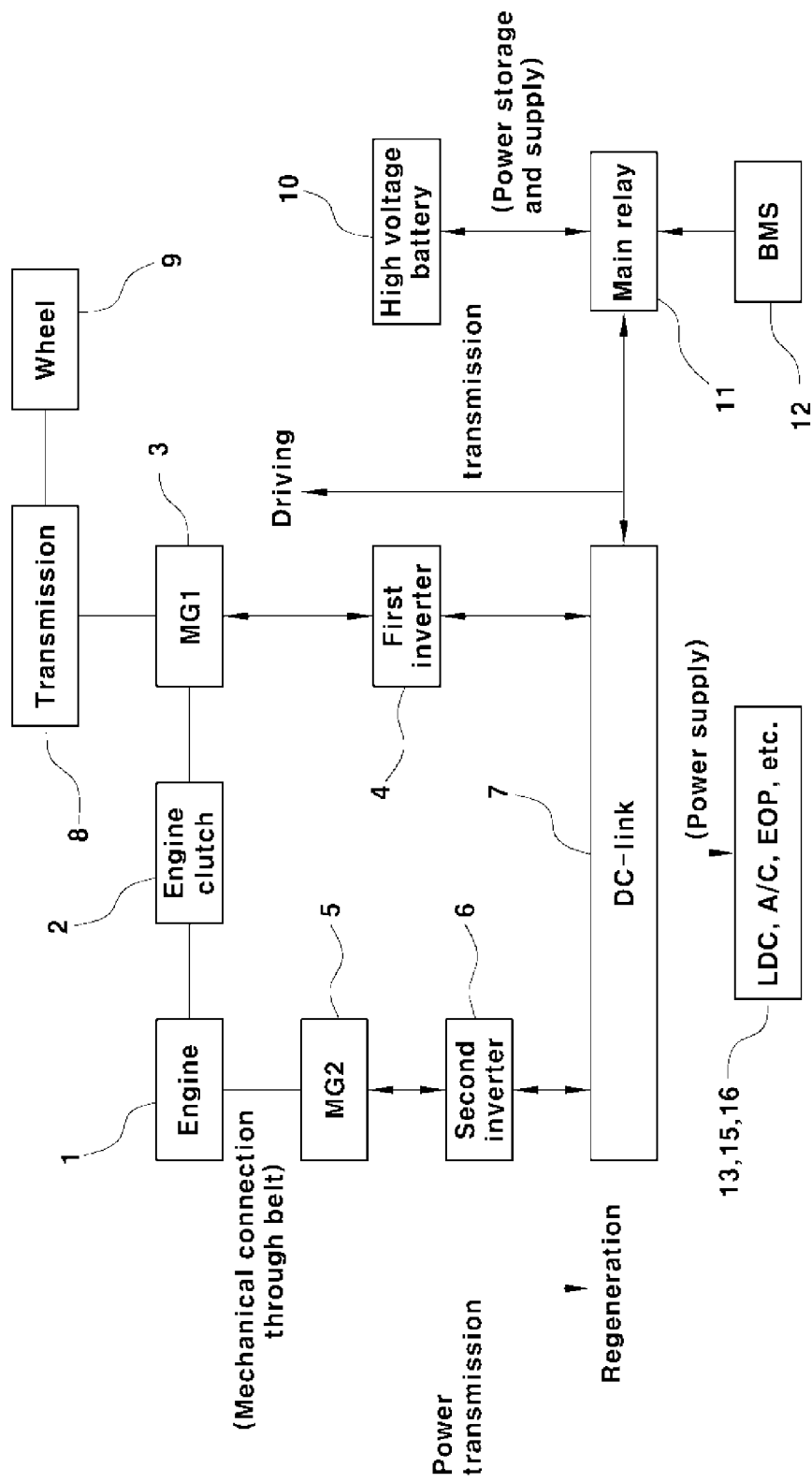
FIG. 3 is a block diagram illustrating power transmission flow in emergency driving of a hybrid vehicle according to an embodiment of the present invention.
Figure 4:
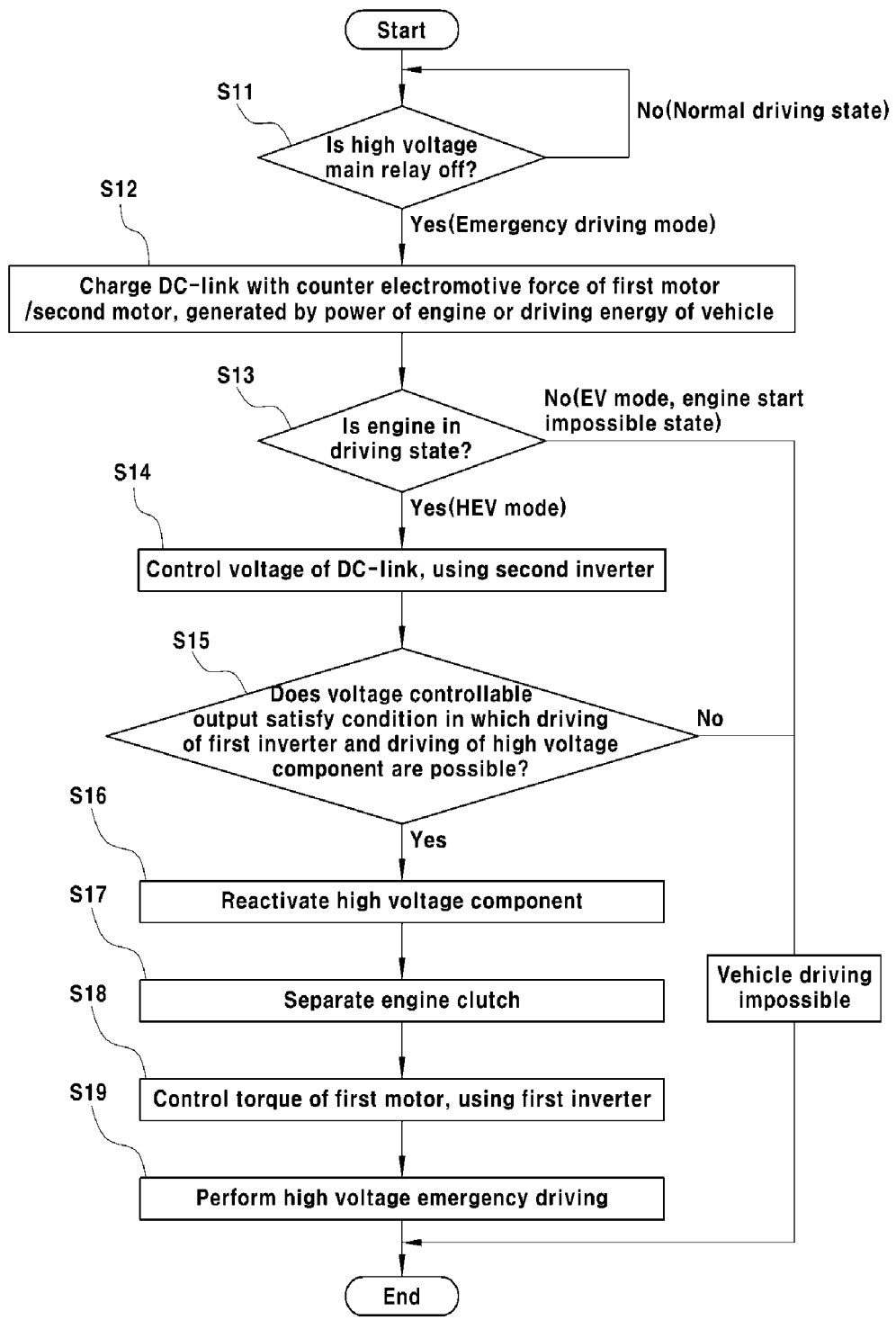
FIG. 4 is a flowchart illustrating a method for emergency driving of the hybrid vehicle according to the embodiment of the present invention.

FIG. 3 is a block diagram illustrating power transmission flow in emergency driving of a hybrid vehicle according to an embodiment of the present invention. FIG. 4 is a flowchart illustrating a method for emergency driving of the hybrid vehicle according to the embodiment of the present invention.

In the following description, the main components of the hybrid vehicle will described with reference to FIGS. 1 and 2.

Figure 5:
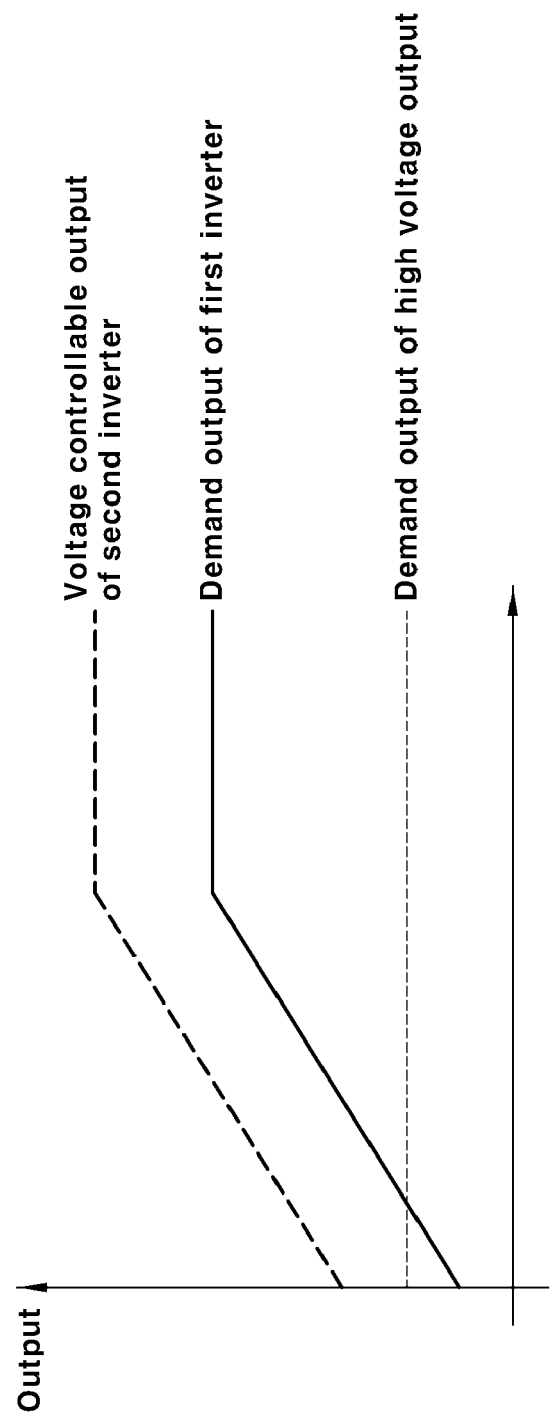
FIG. 5 is a diagram illustrating a voltage controllable output of a second inverter, a demand output of a first inverter, and a demand output of a high voltage component.

FIG. 5 is a diagram illustrating a voltage controllable output of a second inverter, a demand output of a first inverter, and a demand output of a high voltage component such as a low voltage DC to DC converter (LDC) or an electric oil pump (EOP).

First, it is decided whether a high voltage main relay 11 is off during driving of the vehicle (S11). When the main relay 11 is in a normal state in which it is not off, the vehicle maintains normal driving. When the main relay 11 is abnormally off, the vehicle enters into an emergency driving mode (limp-home mode) and performs emergency driving.

Here, the abnormal off state of the main relay 11 may occur due to a defect of the main relay, a defect of a component (BMS, etc.) related to control of the main relay, a defect of a high voltage component, or the like.

When the vehicle enters into an abnormal driving mode, a DC-link 7 is charged by a counter electromotive force of first and second motors (MG1 and MG2) 3 and 5, generated by driving energy of the vehicle or power of an engine 1 (S12).

In case of the emergency driving mode, rotators in the first and second motors 3 and 5 are also rotated by the driving energy of the vehicle or the power of the engine 1 during the driving of the vehicle, and according the counter electromotive force is generated in the first and second motors 3 and 5 by a change in flux of a stator coil.

More specifically, the first motor 3 can receive rotary power transmitted from a wheel 9 according to the rotation of the wheel 9 while the vehicle is driving. The second motor 5 is directly connected to the engine 1 by a belt or the like and thus can receive rotary power of the engine 1 while the engine 1 is driving (i.e., while the starting of the engine is being applied).

Accordingly, as the rotators of the first and second motors 3 and 5 are rotated even in a situation in which the main relay 11 is abnormally off, a counter electromotive force is generated by a change in the flux of the stator coil. The counter electromotive force is charged in the DC-link 7 through the recovery of a diode (reverse parallel diode connected to each switching element in an inverter).

The counter electromotive force is a force in a direction opposite to the driving direction of a motor. The counter electromotive force is in proportion to the speed of the motor (the counter electromotive force of the second motor directly connected to the engine by the belt or the like is in proportion to the speed of the engine). The counter electromotive force may be defined by the following formula.

$$E = \lambda_{pm} \times \omega_r$$

Here, E denotes a counter electromotive force, $\lambda_{pm}$ denotes a counter electromotive force constant, and $\omega_r$ denotes a rotary angular speed.

In the emergency driving mode according to the present invention, the counter electromotive force is charged in a capacitor C of the DC-link 7, and the emergency driving is performed using, as a power source, the DC-link 7 charged by the counter electromotive force.

Next, it is decided whether the engine 1 is in a driving state (i.e., whether the starting of the engine is applied) (S13). If the engine is in a state in which it is not driven (a state in which the vehicle is driven in an EV mode or the starting of the engine is impossible when the main relay is off), the emergency driving of the vehicle according to the present invention cannot be performed, and therefore, the emergency driving mode is ended.

On the other hand, if the engine 1 is in a state in which it is driven (a state in which the vehicle is driven in an HEV mode and an engine clutch is connected when the main relay is off), a voltage control of controlling the voltage of the DC-link 7, using the second motor 5 and a second inverter 6 in a state in which the control of the second inverter 6 is possible, is performed in addition to the charging of the DC-link 7 with the counter electromotive force (S14).

In the emergency driving mode of the present invention, the voltage of the DC-link 7 used as a power source is preferably maintained constant in consideration of driving of a high voltage component and stability of its output.

To this end, the voltage control of the DC-link 7, which enables a constant voltage level to be maintained using the second inverter 6, is performed by a voltage controller (not shown), and the high voltage component is driven using, as a power source, the DC-link 7 voltage-controlled as described above.

In this state, a current control is performed so that a corresponding torque is output from the second motor 5 according to a torque instruction generated in the voltage controller, thereby controlling the voltage of the DC-link 7. The voltage controller controls the second inverter 6 by outputting a demand torque instruction to the second inverter 6.

Here, the torque instruction for controlling the second inverter 6, as shown in the following functional formula, may become a value calculated according to a voltage target value of the DC-link 7 and a detection value that is an actual voltage of the DC-link 7. In addition, the torque instruction for controlling the second inverter 6 may be calculated with reference to a factor such as a rotary speed of the second motor 5.

$$T^*_{e2} = f(V_{DC\_ref}, V_{DC}, W_{rpm})$$

Here, $T^*_{e2}$ denotes a torque instruction of the voltage controller with respect to the second inverter 6, $V_{DC\_ref}$ denotes a voltage target value of the DC-link 7, $V_{DC}$ denotes an actual voltage detection value of the DC-link 7, and $W_{rpm}$ denotes a rotary speed of the second motor 5.

Preferably, when generating a torque instruction, the voltage controller may be configured to compare the voltage target value $V_{DC\_ref}$ of the DC-link 7 with the actual voltage detection value $V_{DC}$ of the DC-link 7 and add/subtract the torque instruction according to the difference between the voltage target value and the actual voltage detection value.

When the actual voltage detection value $V_{DC}$ of the DC-link 7 is smaller than voltage target value $V_{DC\_ref}$ of the DC-link 7, the voltage controller may configured to generate a regenerative torque instruction for generating a regenerative torque. When the actual voltage detection value $V_{DC}$ of the DC-link 7 is greater than voltage target value $V_{DC\_ref}$ of the DC-link 7, the voltage controller may be configured to generate a driving torque instruction for generating a driving torque (when the voltage target value and the voltage detection value are equal to each other, the torque instruction is zero).

Thus, the voltage controller controls the torque instruction by actively dealing with a voltage drop of the DC-link 7 due to the high voltage component or a change in the input counter electromotive force, so that it is possible to constantly maintain the voltage of the DC link 7.

In the voltage control process, the voltage of the DC-link 7 is necessarily maintained at a level suitable for driving of the high voltage component, and therefore, the voltage target value of the DC-link 7 is previously set within an appropriate voltage range of the high voltage component.

In the voltage control of the DC-link 7, it is decided whether the voltage controllable output (power) of the second inverter 6 satisfies a condition in which the driving of a first inverter 4 and the driving of the high voltage component for the emergency driving of the vehicle are possible (S15).

Here, when the voltage controllable output of the second inverter 6 satisfies the condition, non-defect components including an LDC 13, an engine clutch 2, a transmission, an EOP 16 and the like are reactivated using, as a power source, the DC-link 7 of which voltage is controlled by the second inverter 6, in a state in which the charging and voltage control of the DC-link 7 are made (S16).

In addition, the engine clutch 2 between the engine 1 and the first motor 3 is separated (S17), and the torque of the first motor 3 is controlled using the first inverter 4, while using, as the power source, the DC-link 7 charged by the counter electromotive force of the motor during driving of the engine 1, thereby performing the emergency driving for driving the vehicle (S18 and S19).

In the process of deciding whether the voltage controllable output of the second inverter 6 satisfies the condition in which the driving of the first inverter 4 and the driving of the high voltage component for the emergency driving of the vehicle are possible, the voltage controllable output of the second inverter 6, the demand output of the first inverter 4 and the demand output of the high voltage component may be used as follows, and their examples are the same as shown in FIG. 5.

Satisfaction of the voltage controllable output of the second inverter: voltage controllable output $(T^*_{e2} \times \omega_{r2})$ of the second inverter > demand output $(T^*_{e1} \times \omega_{r1})$ of the first inverter + demand output of the high voltage component Insufficiency of the voltage controllable output of the second inverter: voltage controllable output $(T^*_{e2} \times \omega_{r2})$ of the second inverter ≤ demand output $(T^*_{e1} \times \omega_{r1})$ of the first inverter + demand output of the high voltage component Here, $T^*_{e2}$ is a torque instruction with respect to the second inverter 6, $\omega_{r2}$ is a rotary angular speed of the second motor 5, $T^*_{e1}$ is a torque instruction with respect to the first inverter 4, and $\omega_{r1}$ is a rotary angular speed of the first motor 3.

When the voltage controllable output of the second inverter 6 satisfies the condition in which the driving of the first inverter 4 and the driving the high voltage component are possible (satisfaction of the voltage controllable output of the second inverter), the emergency driving (vehicle driving through the driving of the high voltage component and the control of the first motor) using the DC-link 7 as the power source is performed (driving in the EV mode).

When the voltage controllable output of the second inverter 6 is insufficient, the emergency driving of the vehicle according to the present invention cannot be performed, and therefore, the emergency driving mode is ended.

As described above, in the present invention, the DC-link 7 is charged by the counter electromotive force generated in the first and second motors 3 and 5, and the high voltage component is reactivated using, as the power source, the DC-link 7 voltage-controlled through the second inverter 6. Subsequently, the vehicle is driven using the first motor 3 as a driving source in the state in which the engine clutch 2 is separated. Accordingly, the driving of the vehicle is possible in the limp-home mode (emergency driving mode) even in the situation in which the main relay 11 is off.

Particularly, in the present invention, power required to drive the high voltage component such as the LDC 13, an A/C 15 or the EOP 16 can be provided while the voltage control of the DC-link 7 is being performed using the second inverter 6. Further, the driving of the first inverter 4 and the driving of the first motor 3 are possible using the output of the DC-link 7, and thus the emergency driving of the vehicle is possible.

In addition, the discharging of a low voltage (12V) battery 14 can be prevented by operating the LDC 13.

Figure 6:
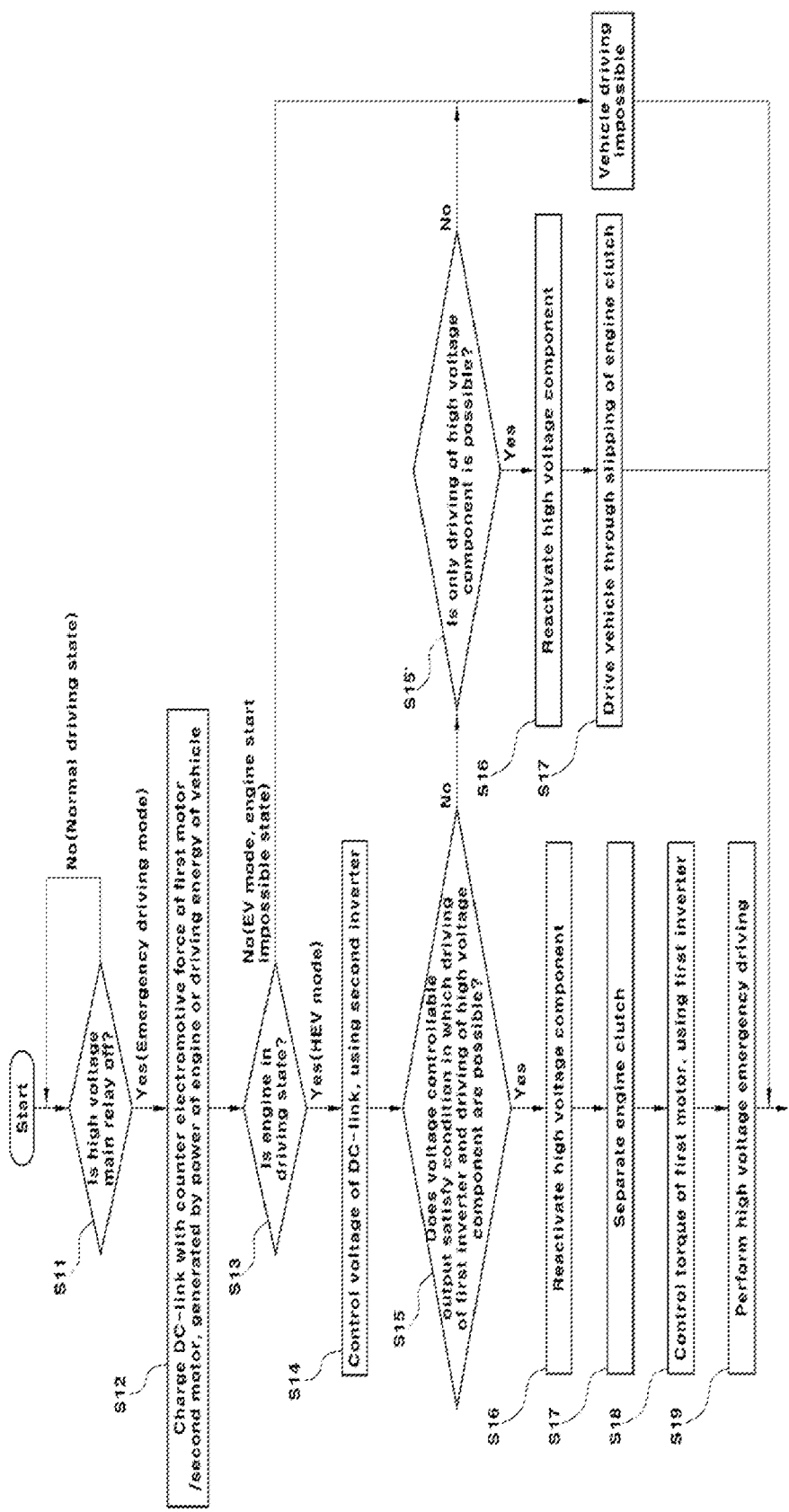
FIG. 6 is a flowchart illustrating a method for emergency driving of the hybrid vehicle according to another embodiment of the present invention.

Meanwhile, FIG. 6 is a flowchart illustrating a method for emergency driving of the hybrid vehicle according to another embodiment of the present invention. When being compared with the embodiment of FIG. 4, the embodiment of FIG. 6 is different from that of FIG. 4 in that when the voltage controllable output of the second inverter 6 does not satisfy the condition in which the driving of the first inverter 4 and the high voltage component is possible, the driving of the vehicle is performed through slipping of the engine clutch 2.

More specifically, in the embodiment of FIG. 4, when both the driving of the first inverter 4 and the driving of the high voltage component cannot be performed due to the insufficiency of the voltage controllable output of the second inverter 6, the emergency driving mode is ended.

On the other hand, in the embodiment of FIG. 6, if the voltage controllable output of the second inverter 6 satisfies the condition in which both the driving of the first inverter 4 and the driving of the high voltage component are possible, the vehicle is driven by the first motor 3 (driving of the vehicle in the EV mode) (S16 to S19). However, if only the driving of the high voltage component is possible due to the insufficiency of the voltage controllable output of the second inverter 6, the high voltage component is driven (S15' and S16'), and the vehicle is then driven through slipping of the engine clutch (S17').

That is, in the condition in which only the driving of the high voltage component is possible due to the insufficiency of the voltage controllable output of the second inverter 6, the high voltage component including the EOP 16 or the like is driven using the voltage-controlled DC-link 7 as a power source, and the slipping of the engine clutch 2 is controlled by forming and controlling oil pressure. Simultaneously, the emergency driving of the vehicle is performed using driving forces of the engine 1 and the first motor 3 (driving of the vehicle in the HEV mode).

Here, the condition in which only the driving of the high voltage component is possible may be defined by 'demand output of the first inverter+demand output of the high voltage component≥voltage controllable output of the second inverter>demand output of high voltage component'.

If even the driving of the high voltage component is impossible due to the insufficiency of the voltage controllable output of the second inverter 6, the emergency driving mode is ended.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for emergency driving of a hybrid vehicle which includes an engine, a first motor connected to the engine through an engine clutch, the first motor being connected to a vehicle wheel side so that power transmission is possible, and a second motor directly connected to the engine so that power transmission is possible, the method comprising:
   charging a DC-link with a counter electromotive force of the first and second motors, generated by driving energy of the vehicle or power of the engine when a main relay is off during driving of the vehicle;
   controlling the voltage of the DC-link, using a second inverter connected between the DC-link and the second motor in an engine driving state; and
   using the DC-link of which voltage control is performed as a power source for the emergency driving of the vehicle,
   wherein, in the emergency driving of the vehicle using the DC-link as the power source, the engine clutch between the engine and the first motor is separated, and the vehicle is then driven by a driving force of the first motor.

2. The method of claim 1, further comprising deciding whether the voltage controllable output of the second inverter satisfies a condition in which the driving of a first inverter connected between the DC-link and the first motor and the driving of a high voltage component are possible,
   wherein, when the condition is satisfied, the emergency driving where the vehicle is driven by the driving force of the first motor is performed.

3. The method of claim 2, wherein, when the condition is not satisfied, it is decided whether the voltage controllable output of the second inverter satisfies a condition in which the driving of the high voltage component is possible, and
   wherein, when the voltage controllable output of the second inverter satisfies the condition in which the driving of the high voltage component is possible, the engine clutch is controlled in a slipping state, and simultaneously, the emergency driving where the vehicle is driven by the driving force of the first motor using the DC-link as the power source and the power of the engine.

4. The method of claim 2, wherein, when a voltage controllable output $(T^*_{e2} \times \omega_{r2})$ of the second inverter>demand output $(T^*_{e1} \times \omega_{r1})$ of the first inverter+demand output of the high voltage component, it is decided that the voltage controllable output of the second inverter satisfies the condition in which the driving of the first inverter and the driving of the high voltage component are possible, and
   wherein $T^*_{e2}$ is a torque instruction with respect to the second inverter, $\omega_{r2}$ is a rotary angular speed of the second motor, $T^*_{e1}$ is a torque instruction with respect to the first inverter, and $\omega_{r1}$ is a rotary angular speed of the first motor.

5. The method of claim 1, wherein, in the emergency driving of the vehicle using the DC-link as the power source, the high voltage component is driven using the DC-link as the power source.

6. The method of claim 5, wherein the high voltage component includes an electric oil pump (EOP) for forming oil pressure of the engine clutch and a transmission.

7. The method of claim 1, wherein, in the controlling of the voltage of the DC-link, the second inverter is controlled to receive a torque instruction for maintaining a constant voltage from a voltage controller and to output torque according to the torque instruction from the second motor.

8. The method of claim 7, wherein, in the controlling of the voltage of the DC-link, the torque instruction for controlling the second inverter is calculated according to a voltage target value of the DC-link, a voltage detection value of the DC-link and a rotary speed of the second motor.

9. The method of claim 8, wherein, in the controlling of the voltage of the DC-link, a regenerative torque instruction is generated when the voltage detection voltage of the DC-link is smaller than the voltage target value of the DC-link, and a driving torque instruction is generated when the voltage detection voltage of the DC-link is greater than the voltage target value of the DC-link.

* * * * *